US006228978B1

(12) United States Patent
Agarwal et al.

(10) Patent No.: US 6,228,978 B1
(45) Date of Patent: *May 8, 2001

(54) STAR-BRANCHED POLYMER WITH DENDRIMER CORE

(75) Inventors: Pawan Kumar Agarwal, Houston; Hsien-Chang Wang, Bellaire; Yu Feng Wang, Houston, all of TX (US); Jean M. J. Frechet, Oakland, CA (US); Shah A. Haque, Houston, TX (US)

(73) Assignee: Exxon Mobil Chemical Patents Inc, Bayton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,271

(22) Filed: Jun. 19, 1998

Related U.S. Application Data
(60) Provisional application No. 60/050,767, filed on Jun. 25, 1997.

(51) Int. Cl.[7] .................................................. C08G 73/00
(52) U.S. Cl. .......................... 528/363; 525/335; 525/387; 525/314; 524/252; 526/52.4; 526/314; 526/333
(58) Field of Search ............................ 252/411; 525/191, 525/173, 387, 335; 526/52.4, 333; 528/363, 423, 424; 524/252

(56) References Cited

U.S. PATENT DOCUMENTS

| | | | |
|---|---|---|---|
| 4,152,499 | 5/1979 | Boerzel et al. ..................... | 526/52.4 |
| 4,316,973 | 2/1982 | Kennedy ............................. | 525/335 |
| 4,599,433 | 7/1986 | Bronstert et al. .................... | 549/255 |
| 4,938,885 | 7/1990 | Migdal ................................ | 252/51.5 |
| 5,316,973 | 5/1994 | Wang et al. ......................... | 437/188 |
| 5,387,617 | 2/1995 | Hedstrand et al. .................... | 521/79 |
| 5,393,795 | 2/1995 | Hedstrand et al. ................... | 521/134 |
| 5,393,797 | 2/1995 | Hedstrand et al. ................... | 521/134 |
| 5,458,796 | * 10/1995 | Storey et al. ........................ | 508/591 |
| 5,530,092 | 6/1996 | Meijer et al. ........................ | 528/363 |
| 5,560,929 | 10/1996 | Hedstrand et al. ................... | 424/486 |
| 5,587,446 | * 12/1996 | Frechet et al. ....................... | 526/333 |
| 5,663,239 | * 9/1997 | Coolbaugh et al. .................. | 525/314 |
| 5,849,847 | * 12/1998 | Quirk ................................... | 525/193 |

FOREIGN PATENT DOCUMENTS 415 248 A1   3/1991   (EP) .

OTHER PUBLICATIONS

*Polymer Bulletin,* v.1(8)—Jun., 1979—pp. 575–580—J. P. Kennedy, et al., "New Telechelic Polymers and Sequential Copolymers by Polyfunctional Initiator–Transfer Agents (INIFERS)".
Database WPI, Section Ch, Week 9728, Derwent Publications XP002078911 and JP 01 261405 A (Kanegafuchi Chem KK), Oct. 18, 1989 (See Abstract).
Feinberg, et al., *Polymer Preprints,* v.17(2)—Aug., 1976— pp. 797–807—"The Cationic Polymerization of Styrene Using Boron Halides and the Synthesis of Styrene–Isobutylene Block Copolymers Using $BCl_3$".
Kennedy, et al., *Polymer Preprints,* v.17(1)—Apr., 1976— pp. 194–199—"$BCl_3$ Rediscovered: An Efficient Coinitiator for Cationic Olefin Polymerization and for Synthesis of Isobutylene–Styrene Block Copolymers".
Kennedy, et al., *Journal of Polymer Science: Polymer Chemistry* Edition, v.18(1980)—pp. 1523–1537—"New Telechelic Polymers and Sequential Copolymers by Polyfunctional Initiator–Transfer Agents . . . ".
Kennedy, et al., *Journal of Polymer Science: Polymer Chemistry* Edition, v.15(12) (1977)—pp. 2801–2819— "Cationic Polymerization with Boron Halides. III. $BCl_3$ Coinitiator for Olefin Polymerization".

* cited by examiner

*Primary Examiner*—David W. Wu
*Assistant Examiner*—Tanya Zalukaeva
(74) *Attorney, Agent, or Firm*—Brent M. Peebles; Kevin M. Faulkner; Joseph F. Reidy

(57) ABSTRACT

Polyisobutylene (PIB) functionalized with terminal reactive unsaturation is disclosed. Carbocationically polymerized monohalogen-terminated PIB is dehydrohalogenated in a hydrocarbon solvent using an alkoxide of the formula RO-M wherein R is alkyl of at least 5 carbon atoms and M is alkali metal. The PIB obtained has terminal unsaturation which is 100% in the reactive 'exo' form which can be converted to succinic anhydride groups (PIB-SA) by the ene reaction with maleic anhydride. The PIB-SA is reactive with amine functional dendrimers to obtain a star-branched polymer having a dendrimer core and PIB branches joined by succininide linkages. Blends of the star-branched polymer with polypropylene have improved energy absorption properties and controllable moisture/oxygen permeabilities useful in films.

13 Claims, No Drawings

STAR-BRANCHED POLYMER WITH DENDRIMER CORE

This application is a Continued Prosecution Application of U.S. patent application Ser. No. 09/100,271, filed Jun. 19, 1998, this application claims benefit of provisional application Ser. No. 60/050,727, filed Jun. 25, 1997.

FIELD OF THE INVENTION

The present invention relates to a method for preparing polyisoolefins having exclusive 'exo' terminal double bond chain ends, the polyisoolefins having exclusive 'exo' terminal double bonds, a method for preparing a star-branched polymeric material from the polyisoolefin and a dendrimer, and the functionalized polyisobutylenes and the star-branched polymeric materials prepared by these methods. The present invention also relates to blends of polyolefins and the star-branched polymer, and films and fibers made from these blends. The present invention also relates to a method for preparing star-branched polymeric material from a polyolefin and a hydrolytically stable dendrimer and the star branched material prepared by this method.

BACKGROUND OF THE INVENTION

Dendrimers are well defined globular molecules. These are generally prepared by stepwise or reiterative reaction of multifunctional monomers to obtain a branched structure. In U.S. Pat. No. 5,530,092, for example, the repetition of double Michael addition of acrylonitrile starting with a primary diamine followed by hydrogenation obtains two primary amines for each initial amine. This doubles the number of primary amine groups. Thus, beginning with a diamine, the first generation dendrimer (G1) has four primary amines; the second generation (G2) has eight primary amines; the third generation (G3) has sixteen primary amines; the fourth generation (G4) has thirty-two primary amines; the fifth generation (G5) has sixty-four primary amines in the outer shell, and so on. These polyamine dendrimers are said to be stable to degradation through hydrolysis reactions.

Amine-terminated polyamidoamine, polyethyleneimine and polypropyleneimine dendrimers are also known, for example, from U.S. Pat. Nos. 5,393,797; 5,393,795; 5,560,929; and 5,387,617, all to Hedstrand et al.

Polyisobutenyl succinimide-polyamidoamine dendrimer star-branched polymers obtained by reacting second generation polyamidoamine dendrimers with polyisobutenyl succinic anhydride are disclosed in Migdal's U.S. Pat. No. 4,938,885 [to Migdal]. These polymers are said to have dispersancy powers in lubricating oils and to exhibit antioxidant activity. However, these products are not hydrolytically stable.

U.S. Pat. No. 5,316,973 discloses telechelic olefin polymers such as telechelic diolefin polyisobutylene prepared by refluxing dihalogen polyisobutylene in tetrahydrofuran with a strong base such as potassium t-butoxide. This is said to produce a product which has $^1$H NMR spectroscopy at 60 MHz consistent with a terminal vinylene functionality of 2.0.

Boerzel et al., U.S. Pat. No. 4,152,499, discloses polyisobutylene said to contain a proportion of double bonds reactive with maleic anhydride of from 60 to 90 percent of the double bonds present in the polyisobutylene. The polyisobutylenes are prepared using a boron trifluoride polymerization initiator with a short polymerization time.

Bronstert et al., U.S. Pat. No. 4,599,433, discloses preparation of polyisobutylene-succinic anhydrides with titanium, zirconium or vanadium alkoxides as catalysts which are said to isomerize polyisobutylene during the reaction making it more reactive with the maleic anhydride. The polyisobutylene-succinic anhydride adduct is in turn reacted with a polyamine to obtain a lubricating oil additive.

SUMMARY OF THE INVENTION

The present invention arises, in part, from a method for preparing polyisobutylene having reactive terminal vinylidene groups. The process involves dehydrohalogenating halogen-terminated polyisobutylene in a hydrocarbon solvent using a metal alkoxide soluble in the hydrocarbon solvent. This method does not require tetrahydrofuran (THF) as a solvent. This obtains a polyisobutylene terminated with an unsaturated end group which is in the reactive 'exo' form, and free of the corresponding 'endo' form. This method avoids the use of the undesirable tetrahydrofuran as a solvent. The presence of tetrahydrofuran renders the dehydrohalogenation reaction insufficiently stereospecific and introduces the possibility of peroxide formation.

In one aspect, the present invention comprises a method for preparing a polyisoolefin having double bond chain ends exclusively in the 'exo' form. The method includes the step of dehydrohalogenating the halogen-terminated polyisoolefin in a hydrocarbon solvent in the presence of hydrocarbon-soluble alkoxide. The halogen-terminated polyisoolefin is generally obtained by carbocationically polymerizing the isoolefin in the presence of a halogenating initiator according to techniques well known in the art to obtain halogen-terminated polyisoolefin. The preferred alkoxides are represented by the formula RO-M wherein R is alkyl of at least 5 carbon atoms and M is alkali metal. The polyisoolefin obtained from the carbocationic polymerization process can be telechelic, or in one embodiment is monohalogen-terminated. The isoolefin preferably has from 4 to about 12 carbon atoms, and more preferably is isobutylene. The alkoxide is preferably a branched alkoxide, more preferably tertiary-pentoxide (t-pentoxide), and the alkali metal can be one of lithium, sodium, cesium, rubidium, preferably potassium. The solvent should be essentially free of tetrahydrofuran. The method thus effected in accordance with the invention obtains polyisobutylene having a terminal double bond chain end in 'exo' form, essentially free of 'endo' form.

In another aspect, the invention comprises a method for preparing a star-branched polymeric material having a hydrophilic dendrimer core and hydrophobic polyolefin branches. The method includes reacting polyisoolefin-succinic anhydride with a dendrimer having primary amine functionality. The polyisoolefin-succinic anhydride is preferably polyisobutylene-succinic anhydride (PIBSA), most preferably prepared by the steps of: (1) carbocationically polymerizing isobutylene in the presence of a halogenating initiator, such as 2,4,4-trimethylpentyl chloride, to obtain monohalogen-terminated polyisobutylene; (2) dehydrohalogenating the monohalogen-terminated polyisobutylene in a hydrocarbon solvent in the presence of soluble alkoxide represented by the formula RO-M, R being an alkyl of at least 5 carbon atoms and M being an alkali metal; and (3) functionalizing the dehydrohalogenated polyisobutylene with maleic anhydride.

The star-branched polymer preparation preferably includes preparing the dendrimer by the steps of: (1) forming the double Michael addition product of acrylonitrile or methyacrylonitrile with a primary polyamine; (2) hydrogenating the double Michael addition product from step (1) to form primary polyamine functionality; and (3) optionally, repeating steps (1) and (2) using the product from step (2) to obtain higher generations of dendrimers.

The primary polyamine in the initial step (1) is preferably a diamine, such as, for example, 1,2-diaminoethane, 1,3-diaminopropane, 1,4-diaminobutane or the like.

The invention also includes terminally monomaleated polyisobutylene essentially free of unmaleated polyisobutylene, preferably less than 10 percent by weight of the polyisobutylene.

The invention also embraces the star-branched polymeric material prepared by the method described above which is essentially free of unreacted polyisobutylene. By using a mixture of two or more polyisobutylenes of different molecular weights the branches on each dendrimer core can have mixed lengths.

Moreover, the present invention includes star branched polymeric material comprising a hydrophilic dendrimer core with mixed branches of functionalized polyolefin and the polyisoolefin. The polyolefin branches can be a polymer or copolymer of ethylene, propylene, butylene or the like. Preferably, the polyisoolefin is polyisobutylene.

Moreover, the present invention includes star branched polymeric material comprising a hydrolytically stable dendrimer core with branches of polyolefins such as polyethylene, polypropylene, ethylene-propylene copolymers, and the like. The polyolefin is preferably polypropylene made with a metallocene catalyst.

The present invention also provides a composition comprising a blend of polyolefin, such as polyethylene, polypropylene, ethylene-propylene copolymers and the like, with a star-branched polymer comprising a dendrimer core and polyisoolefin branches or the mixed branches. The polyolefin is preferably polypropylene, more preferably polypropylene made with a metallocene catalyst.

The blend has particular utility in films with improved tear and puncture resistance and controlled moisture/oxygen permeability.

DESCRIPTION OF THE INVENTION

One aspect of the invention comprises a method for preparing polyisoolefin such as polyisobutylene which has a reactive 'exo' terminal double bond chain end, and is essentially free of the non-reactive 'endo' terminal double bond chain end. The method has particular advantage in functionalizing polyisobutylene to form substantially exclusive 'exo' reactive unsaturated groups, and to use hydrocarbon solvents for the functionalization reactions. Accordingly, polyisobutylene is referred to below for illustrative purposes only and as a preferred embodiment.

Halogen-terminated polyisoolefins are conventionally prepared by carbocationically polymerizing isoolefins having from 4 to about 12 carbon atoms in the presence of a halogenating agent according to techniques well known in the art. Briefly, the isoolefin is polymerized using halogenating initiators such as 2,4,4-trimethylpentyl chloride with a Friedel-Crafts acid co-initiator such as $BCl_3$ or $TiCl_4$ in appropriate halohydrocarbon solvent such as methyl chloride, methylene chloride or the like. More detailed isoolefin polymerization techniques for obtaining a halogen-terminated polyisoolefin are described in Feinberg et al., *Polymer Preprints*, vol. 17, p. 797 (1976); Kennedy et al., *Polymer Preprints*, vol. 17, p. 194 (1976); Kennedy et al., *Journal of Polymer Science*, vol. 15, p. 2801 (1977); and Kennedy et al., *Journal of Polymer Science, Polymer Chemistry Edition*, vol. 18, p. 1523 (1980) which are incorporated herein by reference.

The polyisobutylene can be monohalogenated, but di-halogenated or telechelic polyisobutylene is also known for example, from U.S. Pat. No. 4,316,973 to Kennedy which is incorporated herein by reference.

In accordance with this invention, dehydrohalogenation of the halogen-terminated polyisobutylene is conducted in the presence of a strong base represented by the formula RO-M wherein R represents an alkyl group having at least 5 carbon atoms and M is an alkali metal. The preferred base is potassium t-pentoxide, and is referred to below for illustrative purposes only and as a preferred embodiment.

The dehydrohalogenation reaction is preferably conducted in an aliphatic solvent such as hexane, cyclohexane, heptane, octane or the like. Solvents such as tetrahydrofuran (THF) are not employed because of the potential for this solvent to form peroxides and produce undesirable side reactions. The dehydrohalogenation generally proceeds under reflux for a period of time sufficient to substantially convert the halogen-terminated polyisobutylene to vinylidene-terminated polyisobutylene (PIB-U), typically a period of several hours. The reaction can be allowed to cool to room temperature, washed with aqueous mineral acid to remove potassium hydroxide, then with acetone/water, preferably in a volume ratio of from 1:4 to 9:1, until neutral to remove t-pentanol. The product can be dried with a hygroscopic material such as $CaCl_2$. Residual solvent can be evaporated, for example, at elevated temperature under vacuum.

The weight average molecular weight of the PIB-U can range from about 500 to about 500,000 and greater depending upon the desired end use. For branches on a dendrimer core, the PIB preferably has a molecular weight up to 50,000, more preferably from 500 to 20,000.

According to the present invention the PIB-U is functionalized for reactivity with amine. The PIB-U can have the reactive terminal unsaturation converted, for example, to succinic anhydride. Succinic anhydride groups are preferred, and thus conversion of the PIB-U to succinic anhydride-terminated PIB (PIB-SA) is preferred. PIB-SA is referred to below for illustrative purposes only and as a preferred embodiment.

The PIB-U is converted to PIB-SA by heating a mixture of PIB-U and maleic anhydride in approximately stoichiometric proportions, typically with a slight excess of maleic anhydride, generally to a temperature from 170° to 250° C. This ene reaction can also be effected at elevated pressure with or without a conventional ene catalyst.

The PIB-SA can be grafted to any dendrimer core having primary amine-terminated branches. A preferred dendrimer core is the dendritic macromolecule described in U.S. Pat. No. 5,530,092 which is incorporated herein by reference in its entirety. Briefly, the dendrimer core is prepared by reacting functional groups of a primary diamine with acrylonitrile or methacrylonitrile, reducing the incorporated nitrile groups to amine groups, and if desired, reacting the amine groups with further acrylonitrile or methacrylonitrile units in a reiterative fashion to prepare succeeding generations in the branches emanating from the core.

As an example, 1,2-diaminoethane or 1,4 diaminobutane are reacted with acrylonitrile or methacrylonitrile to form the cyanide-terminated double Michael addition reaction product. This product is then hydrogenated to obtain a first generation product (G1) having 4 terminal amine groups. By reiterating the process, second, third and fourth generation products (G2, G3, G4) can be obtained which will respectively have 8, 16, and 32 terminal amine groups and so on.

The PIB-SA is grafted onto the amine groups in the outer shell of the dendrimer by condensation at elevated temperature to form succinimide linkages, with or without a solvent. Preferably, the PIB-SA and dendrimer are heated to the boiling point of the solvent, such as toulene, for a sufficient length of time to obtain a majority of succinimide linkages, but with some succinamic acid linkages. This is preferably followed by evaporation of the solvent and heating at 90°–140° C., preferably 110°–120° C., under high vacuum for a period of time effective to effect complete ring closure, i.e. conversion of the succinamic acid to succinimide.

The star-branched polymer comprising the dendrimer core and the PIB branches via succinimide linkages has a number of uses, including, for example, a viscosity modifier in organic liquid, as a pour point depressant in diesel fuel, as a motor oil additive, as a rheology modifier or processing aid in thermoplastic compositions, as an adhesion promoter between polar and nonpolar surfaces (especially by leaving some unreacted terminal amine groups in the dendrimer core by using substoichrometric amounts of the PIB), and the like. Since the star-branched polymer is generally free of unreacted PIB, it has a greater effectiveness per mass unit and less likely to have adverse effects otherwise due to the presence of substantial amounts of unreacted PIB.

Using mixed-molecular weight PIB results in branches of varying lengths. Using a mixture of hydrolytically stable dendrimer cores results in varying core sizes and a varying number of branches, e.g. G1 with G2 and/or G3 dendrimers. Furthermore, by substituting some or all of the PIB branches with polyethylene, polypropylene or ethylene-propylene copolymer branches, for example, the properties of the star-branched polymer can be further altered to tailor the star-branched polymer for use in a wider range of systems, e.g. as a processing aid in polyethylene, polypropylene and/or ethylene-polypropylene copolymer compositions. Mixed-branch star polymers are prepared, for example, by reacting the dendrimer core with a mixture of PIB-SA and maleated polyethylene, polypropylene and/or ethylene-polypropylene copolymer. The star branched polymer can also comprise the hydrolytically stable dendrimer core and branches of polyolefins.

The star-branched polymer is particularly effective in blends with polyolefins as a means of controlling the transmission of moisture and gases through films made from the blends. The polyolefin can be polyethylene, polypropylene, ethylene-polypropylene copolymer, polyisobutylene or the like. In a preferred embodiment the star-branched polymer is used in a blend with polypropylene made with a metallocene catalyst. The blend can contain up to about 20 parts by weight of the star-branched polymer, preferably 1 to 5 parts by weight, per 100 parts by weight of the polypropylene. The type and amount of star-branched polymer in the blend can be adjusted to obtain the desired balance between physical properties on the one hand, and moisture and oxygen permeability on the other. Generally, the use of a higher generation star-branched polymer (e.g. PIB-G2 versus PIB-G1) introduces more of the hydrophilic core material into the blend and increases moisture/gas permeability. The polypropylene blends have markedly enhanced large strain energy absorbing properties which are important in tear and puncture resistance. The blends also have high elongation properties suitable for polypropylene fiber applications.

The blends can be prepared by solution or melt mixing using conventional equipment. Melt mixing can be achieved by adding the star-branched polymer to the polypropylene in the final pellitization/granulation extrusion. Post-granulation blending can also be done on conventional melt mixing equipment such as a Banbury or Brabender mixer. The polypropylene is preferably melted prior to addition of the star-branched polymer. The blends are formed into films or fibers using conventional equipment and techniques.

EXAMPLE 1

Preparation of Exclusive 'exo' Double Bonded

Monochlorine-terminated polyisobutylene (PIB-Cl) was modified to obtain terminal succinic anhydride groups (PIB-SA). The PIB-Cl had Mn of 5000 and Mw of 6050. 100% chlorine-terminated polymer was confirmed by $^1$H NMR. The PIB-Cl (28.5 g) was placed in a reaction flask with 200 ml of 0.35 molar potassium t-pentoxide (t-PeOK) in cyclohexane and refluxed under nitrogen for 36 hours. The reaction product was washed with 10% HCl, water and acetone/water (9:1) until neutral, dried under $CaCl_2$, filtered and dried under vacuum at 90° C. for 2 days. Yield was 25 g. $^1$H MNR at 300 MHZ showed a quantitative 100% conversion to external unsaturated terminal groups (PIB-U).

EXAMPLE 2

Three grams of PIB-Cl was dissolved in 20 ml dry heptane. The solution was clear. Twenty milliliters of potassium t-pentoxide was added. The solution was still clear and contained only one phase, indicating miscibility. The solution was refluxed for 30 hours in a 110° C. bath under a nitrogen atmosphere. The product was washed with water once and five times with 20% acetone-water (20/80). The water wash was neutral. The organic layer was distilled off and vacuum dried at 130° C. for 6 hours. The viscous liquid was dried under vacuum at 65° to 70° C. for 2 days. The recovered polymer (2.8 g) was analyzed by $^1$H NMR and had peaks at 1.75 ppm, 1.95 ppm and 4.65–4.85 ppm indicative of $CH_2$—$C(CH_3)$=$CH_2$ terminal groups. There was no peak at 5.15 ppm, indicating an absence of the undesirable 'endo' double bond, —CH=$C(CH_3)_2$.

COMPARATIVE EXAMPLE 1

The reaction of PIB-Cl with the alkoxide of Example 3 is repeated as above using potassium t-butoxide instead of potassium t-pentoxide. No reaction occurs when the solvent is cyclohexane, heptane or hexane.

COMPARATIVE EXAMPLE 2

Preparation of PIB Containing both 'exo' and 'endo' Double Bonds Synthesized in Single Step In this example, two PIB-U's were prepared. PIB-U1 of Mn 1000; PIB-U2 of Mn 2300 are prepared by carbocationic polymerization of isobutylene using $BF_3$-$OEt_2$ catalyst, which yield 85% 'exo' and 15% 'endo' unsaturation, in both cases.

EXAMPLE 3

Preparation of PIB-SA

The PIB-U of Example 1 (22.5 g) and 5 g of maleic anhydride were placed in a 2-neck flask swept with nitrogen. The flask was heated to 190°–200° C. in a heating mantle with a magnetic stirrer under nitrogen atmosphere for 36 hours, and cooled to room temperature. Dry cyclohexane (200 ml) was added, heated with stirring for 30 minutes, and then filtered. The filtrate was evaporated to about 70 ml, and 300 ml acetone was added while stirring. The mixture was warmed to 45°–50° C. while stirring for 30 minutes, cooled to room temperature and acetone was decanted off. This acetone wash procedure was repeated twice. The polymer was dried under vacuum at about 90° C. for one day. A slightly brown clear liquid (PIB-SA) was obtained (20 g). FTIR confirmed anhydride and $^1$H NMR indicated quantitative conversion to PIB-SA.

COMPARATIVE EXAMPLE 3

Preparation of Partial PIB-SA

PIB-U1/2 prepared in Comparative Example 2 (1 mole equivalent of double bond) and maleic anhydride (MA) (6 mole equivalents of double bond) were placed in a flask filled with argon. The flask was fitted with a condenser, and an argon bubbler at the top. The flask was heated to 190°–200° C. in a metal bath, and the reaction was continued at that temperature while stirring with a magnetic stirrer under argon atmosphere. At this temperature, the viscosity of the mixture (PIB-U1/2 and melted MA) is low, and the magnetic stirrer is efficient for mixing. The reaction was continued for 21 hours, cooled, dissolved in dry hexane (15 gm/100 ml), and filtered to remove unreacted MA. Hexane was evaporated out. The brown viscous mass was stirred with dry acetone (20 gm/100 ml) at 40°–45° C. for 30 mins, allowed to cool, and acetone was decanted off. This was repeated twice to be sure to remove any traces of unreacted MA. The light brown viscous product was then dried under vacuum at 90° C.–100° C. About 85% of 'exo' structure was converted to the corresponding anhydride terminal group. Thus, the products were a mixture of PIB-SA which contained PIB-SA (63%), and unreacted PIB-'exo' double bond (22%) and PIB-'endo' double bond (15%) as confirmed from FTIR.

EXAMPLE 4

Preparation of Star Branched Polymer

The PIB-SA of Example 3 was reacted with dendrimer (G1) obtained from DSM to prepare a star-branched polymer. Ten grams of the PIB-SA was dissolved in 90 ml toluene (dried over molecular sieve) in a 2-neck flask fitted with a gas bubbler. The solution was clear. Then 0.145 g of the G1 dendrimer was dissolved in 5 ml toluene in a vial and transferred to the 2-neck flask. The vial was rinsed with an additional 5 ml toluene which was also transferred to the 2-neck flask. The solution was gently refluxed overnight while stirring under a nitrogen atmosphere. FTIR of the solution indicated formation of free acid (—COOH) and amide (—CONH—). The toluene was distilled off to obtain a light brown viscous product. The product was heated to 110°–120° C. under high vacuum for one day to complete the ring closure reaction, i.e. conversion of succinamic acid to succinimide. FTIR analysis indicated quantitative succinimide derivitization of the dendrimer and was supported by $^1$H NMR.

EXAMPLE 5

Preparation of Star Branched Polymer

The PIB-SA (6 g) of Example 3 was dissolved in 60 ml dry toluene, and 0.12 g of G2 dendrimer obtained from DSM was added. The solution was refluxed for 16 hours under a nitrogen atmosphere. The solvent was distilled off FTIR analysis indicated complete amine-anhydride reaction with a majority of ring closure with some succinamic acid. The product was dissolved in 60 ml cyclohexane, washed twice with water and the cyclohexane was distilled off The slight brown product was washed twice with hot 60 ml acetone. The product was transferred to a vial and heated to 110°–120° C. under high vacuum for 24 hours to effect complete ring closure by conversion of succinamic acid to succinimide. The oven was cooled to room temperature and filled with nitrogen to take out the samples. The product was a slightly brown viscous liquid.

EXAMPLE 6–11

A series of blends were made with two types of isotactic polypropylene and the star branched polymer PIB-G1 of Example 4. The polypropylenes were prepared with a metallocene catalyst (M-iPP) and Ziegler-Natta catalyst (ZN-iPP). Typically, that weight average molecular weight, Mw, of such commercial isotactic polypropylene polymers are in the range of 100,000 to 300,000. The polypropylene and PIB-G1 were dissolved in hot xylene (about 130° C.), precipitated in isopropanol and subsequently dried under vacuum for 24 hours at about 80° C. Thin pads were made by molding for testing. The specimens were tested in accordance with standard ASTM D-432 procedures (Instron cross head speed 0.5 in./min; room temperature; notched specimen). The blend compositions and testing data (average of four tests) are shown in Table 1.

TABLE 1

Composition and Physical Properties of PP/PIB-G1

| Example | 6 | 7 | 8 | 9 | 10 | 11 |
|---|---|---|---|---|---|---|
| Composition (Parts by Weight) | | | | | | |
| M-iPP | 100 | 98 | 95 | 0 | 0 | 0 |
| ZN-iPP | 0 | 0 | 0 | 100 | 98 | 95 |
| PIB-G1 | 0 | 2 | 5 | 0 | 2 | 5 |
| Notched Tensile Test (RT @ 0.5 in./min; average of 4) | | | | | | |
| Modulus (1000 psi) | 247 | 246 | 230 | 213 | 249 | 231 |
| Tensile Strength (1000 psi) | 4.20 | 4.14 | 4.00 | 3.75 | 4.26 | 3.99 |
| Elongation (%) | 11.9 | 18.3 | 25.4 | 31.7 | 22.2 | 15.9 |
| Yield Strain (1000 psi) | 4.20 | 4.14 | 4.00 | 3.75 | 4.26 | 3.99 |
| Yield Elongation (%) | 4.5 | 4.6 | 4.7 | 4.7 | 4.7 | 4.5 |
| Energy/Thickness (lbs-in./in.) | 114 | 164 | 196 | 273 | 210 | 146 |

These data show that the M-iPP blends have enhanced energy absorption without significant loss in inherent strength.

EXAMPLE 12 & 13

Preparation and performance of star branched dendrimer of a functionalized polyolefin (maleic anhydride grafted polypropylene, ma-PP) and a third generation (G-3) dendrimers.

In a laboratory scale Brabender mixer, 100 gm of Ma-PP polymer was added and fluxed for about 10 minutes at 200° C. After completely molten about 0.25 gm of hydrolytically stable G-3 dendrimer was added. The mixture was allowed to mix for about 5 minutes to ensure homogeneity. During mixing, small amounts of anti-oxidants (irganox 1010-Ciba Geigy) was added to avoid PP degradation. Subsequently, the reacted material was compression molded using a lab Carver press to obtain specimen for various tests.

The Ma-PP used in the experiment was an Exxon Chemical product sold under the Trade name Exxelor. Its MFR was 54 as determined by the standard ASTM test. The Mw and MWD of Ma-PP were about 110,000 and 2.3, respectively, as determined by GPC. The G-3 dendrimer used is made by DSM Netherlands. Its molecular weight is reported to be 1684 g/mole. Its chemical nomenclature is DAB(PA)16- 16 cascade: 1,4 diamino butane[4]: (1-azabuitylidene) 12: propylamine.

Physical properties of the parent Ma-PP are compared (Table 2) with that of its reaction product with G-3 dendrimer. It can be readily noted that grafting of G-3 dendrimer had significantly enhance the physical performance of the Ma-PP parent polymers. It is specifically noted that MFR of the blend has been dramatically reduced. The later indicates a grafting reaction of PP chains with each other through G-3 dendrimer.

TABLE 2

| | Composition (Ma-PP to G-3) parts by weight | MFR 230° C.; 2,16 | Modulus x $10^3$, Pa | Yield Stress, Psi | Maximum Displacement in |
|---|---|---|---|---|---|
| Example 12 - Control | 100 | 54 | 153.5 | 3250 | 0.425 |
| Example 13 - Invention | 100 + 0.25 | 27 | 171 | 2855 | 0.371 |

We claim:

1. A hydrolytically stable polymeric material comprising a hydrolytically stable dendrimer core and polyolefin branches prepared in accordance with a reiterative process comprising one or more repetitive steps of:
    (a) reacting a diaminoalkane with an acrylonitrile to form a cyanide-terminated reaction product,
    (b) hydrogenating the reaction product to obtain a first generation product (G1) amine terminated dendrimer,
    (c) reacting G1 with an acrylonitrile and hydrogenating to form a second-generation product (G2) amine terminated dendrimer,
    (d) reacting G1, or G2 or successive Gn, wherein n is greater than 2, with a functionalized polyolefin and
    (e) recovering the polymeric material having a hydrolytically stable dendrimer core and branches of polyolefin emanating from the outer shell of the dendrimer.

2. The star branched polymeric material of claim 1 wherein the polyolefin is a polyisoolefin.

3. The star-branched material of claim 2 wherein the polyisoolefin is polyisobutylene.

4. The star branched polymeric material of claim 3 wherein at least two polyisobutylene branches have different molecular weights.

5. The star branched polymeric material of claim 3 wherein the polyisobutylene branches have a molecular weight between 500 and 20,000.

6. The star branched polymeric material of claim 1 comprising a mixture of dendrimer cores of at least 2 generations.

7. The star branched polymeric material of claim 3 also comprising branches of polyethylene, polypropylene or ethylene-propylene copolymer.

8. The star branched polymeric material of claim 1 wherein the polyolefin is a alpha-olefin polymer.

9. The process in accordance with claim 1 wherein n is 3 or 4.

10. A hydrolytically stable polymeric material comprising a hydrolytically stable dendrimer core and polyolefin branches prepared in accordance with a reiterative process comprising the one or more repetitive steps of:
    (a) reacting a diaminoalkane with an acrylonitrile to form a cyanide-terminated reaction product,
    (b) hydrogenating the reaction product to obtain a first generation product (G1) amine terminated dendrimer, if reiterating,
    (c) reacting G1 with an acrylonitrile and hydrogenating to form a second-generation product (G2) amine terminated dendrimer,
    (d) reacting G1, or if reiterative the G2 or successive Gn, wherein n is greater than 2, with a functionalized polyolefin and
    (e) recovering the polymeric material having a hydrolytically stable dendrimer core and branches of polyolefin emanating from the outer shell of the dendrimer.

11. The process in accordance with claim 9 wherein n is 3 or 4.

12. A hydrolytically stable polymeric material comprising a hydrolytically stable dendrimer core and polyolefin branches, wherein the dendrimer core is a hydrogenated cyanide-terminated dendrimer, and wherein the polyolefin branches are succinamide-terminated polyolefins.

13. A hydrolytically stable polymeric material comprising a hydrolytically stable dendrimer core and polyolefin branches, wherein the dendrimer core is a hydrogenated cyanide-terminated dendrimer resulting from the reaction of a diamino-alkane and acrylonitrile followed by hydrogenation, and wherein the polyolefin branches are succinamide-terminated polyolefins resulting from the reaction of exo-terminated polyisobutylene and maleic anhydride.

* * * * *